US006220029B1

(12) United States Patent
Huber

(10) Patent No.: US 6,220,029 B1
(45) Date of Patent: Apr. 24, 2001

(54) OPERATING ARRANGEMENT

(75) Inventor: Gerhard Huber, Frankenhofen (DE)

(73) Assignee: Hoerbiger Hydraulik GmbH, Schongau (DE)

( * ) Notice: Subject to any disclaimer, the term of this patent is extended or adjusted under 35 U.S.C. 154(b) by 0 days.

(21) Appl. No.: 09/266,948

(22) Filed: Mar. 12, 1999

(30) Foreign Application Priority Data

Mar. 13, 1998 (AT) ........ 457/98

(51) Int. Cl.[7] ........ F16D 31/02
(52) U.S. Cl. ........ 60/477
(58) Field of Search ........ 60/477, 478, 479, 60/473

(56) References Cited

U.S. PATENT DOCUMENTS

| | | | | |
|---|---|---|---|---|
| 2,452,087 | * | 10/1948 | Wagner | 60/477 X |
| 2,669,095 | * | 2/1954 | Bishofberger | 60/477 X |
| 2,679,727 | * | 6/1954 | McLeod | 91/420 X |
| 3,473,325 | * | 10/1969 | Vargo | 60/478 |
| 3,792,710 | * | 2/1974 | McDermott | 91/420 X |
| 3,815,361 | * | 6/1974 | Manini | 60/477 |
| 3,873,844 | * | 3/1975 | Willis | 60/477 X |
| 4,244,122 | * | 1/1981 | Hetrick | 60/477 X |
| 4,551,973 | * | 11/1985 | Broadhead | 60/477 |
| 4,811,562 | * | 3/1989 | Hoffmann et al. | 60/370 |
| 5,149,285 | * | 9/1992 | Kinoshita | 60/477 X |
| 5,975,967 | * | 11/1999 | Nishi | 440/61 |
| 6,042,435 | * | 3/2000 | Nakamura | 440/61 |

* cited by examiner

*Primary Examiner*—John E. Ryznic
(74) *Attorney, Agent, or Firm*—Dykema Gossett PLLC

(57) ABSTRACT

An operating arrangement for movable parts on motor vehicles, especially for trunk lids, folding tops and the like, consists of at least one hydraulic cylinder with a piston rod as the driving means which acts on the movable part either directly or indirectly, e.g., via a hinge, and at least one pump arrangement (7 through 11) mounted on the hydraulic cylinder with a tank, motor, and the like. To create a compact operating arrangement which can be adapted easily and quickly to the given requirements in each case and can also be serviced easily and repaired by replacing individual components, the operating arrangement according to this invention is characterized in that the hydraulic cylinder and the pump arrangement (7 through 11) are two separate parts combined into one unit by a detachable connection, with at least one direct, tubeless flange connection being provided between the pump arrangement and the hydraulic cylinder connecting the pump to at least one duct in the pump arrangement (7 through 11) and at least one duct in an end piece of the hydraulic cylinder which leads to one of its working chambers.

7 Claims, 1 Drawing Sheet

OPERATING ARRANGEMENT

BACKGROUND OF THE INVENTION

1. Field of the Invention

The invention relates to an operating arrangement for movable parts on motor vehicles, especially for trunk lids, folding tops and the like, which has at least one hydraulic cylinder with a piston rod as the driving means to act on the movable part either directly or indirectly, for example by a hinge, and at least one pump arrangement, including tank, motor, and similar items connected to the hydraulic cylinder.

2. The Prior Art

With hydraulic working cylinders it is customary to arrange control valves, non-return valves and safety valves or the like on the cylinder itself as needed, while the pump arrangement, including the tank which supplies pressurized hydraulic fluid to the cylinder, is placed a distance away from the cylinder and is connected to it by pressure pipes. Thus, for example, with operating arrangements for movable parts on motor vehicles, such as trunk lids, engine hoods and the like, the hydraulic cylinders as the driving means are mounted in the immediate vicinity of these parts to be directly linked to them in part, while the pump together with the motor, valve arrangements, tank, etc., can also be mounted at a distance, depending on the available space, e.g., on a mounting plate with a vibration absorber.

The disadvantages of such configurations include, among other things, the long connecting lines required because of the pressure drop occurring in them, the danger of damage, the space required for installation, and also the cost of construction and manufacturing.

The design according to U.S. Pat. No. 4,551,973 is much more compact. This invention concerns a hydraulic drive unit wherein the hydraulic cylinder and the motor-pump unit are mounted on a common base. Because of the fixed size of the common base, however, the possibilities of adapting the unit to different areas of use are very limited, and this makes maintenance and replacement of individual parts very difficult.

The object of the present invention is therefore to provide a compact operating arrangement which can be adapted quickly and easily to the given requirements and can also be serviced easily or repaired by replacing individual parts.

SUMMARY OF THE INVENTION

To achieve this object, in the operating arrangement according to this invention the hydraulic cylinder and the pump arrangement, being two separate parts, are joined by a releasable connection to form a single unit, with there being at least one direct tubeless flanged joint between the pump arrangement and the hydraulic cylinder connecting at least one duct in the pump arrangement and at least one duct in the end piece of the hydraulic cylinder to one of its working chambers, preferably the working chamber on the piston end, to the pump. This yields the most compact possible unit, which can be mounted and moved as a unit, while nevertheless permitting a modular design where the individual parts can be selected and combined as needed, depending on requirements. Also in the event of damage or repairs, the defective part can easily be removed or dismantled and repaired or replaced.

According to another feature of this invention, in the wall of the hydraulic cylinder there is at least one connecting duct leading from one end piece of the hydraulic cylinder to the other end piece and to the other working chamber, preferably from the piston end to the rod end. This further increases the compactness of the operating arrangement while maintaining the parts described above and also reducing the risk of damage and the risk of possible leakage from the system. In all cases, the hydraulic cylinder and pump arrangement are preferably connected to an end piece, especially on the piston end, and the fluid connection to the working chamber at the rod end then leads through the duct provided in the cylinder wall.

According to an advantageous embodiment, the pump arrangement consists of a pump carrier with the pump inserted into it, a tank placed on the side of the pump carrier opposite the pump, and a motor mounted directly on the pump or a pump flange. Thus, tanks can be exchanged as needed without any great effort or replaced by a larger or smaller tank. The pump can also be designed more simply, since it need not be submerged in hydraulic fluid when operating, and it is also better and more readily accessible for maintenance and repairs than a pump located in the tank itself.

A simple connection to and mounting on the motor vehicle can be achieved with this operating arrangement by providing two mounting devices, one of which is located at the end of the piston rod of the hydraulic cylinder and another being aligned with the piston rod at the other end of the hydraulic cylinder and/or the pump arrangement. This permits a cantilevered suspension between the articulated connection point on the motor vehicle and the part to be operated, e.g., the trunk lid, or its hinge arrangement.

At least one of the mounting devices, preferably the one opposite the piston rod, is advantageously designed as a cross hole with a damping bush inserted, preferably a rubber bearing, so that the arrangement can be mounted on the vehicle securely and with a vibration reducing effect.

To simplify manufacture and make it more economical, it is preferable for the hydraulic cylinder be made of an extruded section.

In the following description, this invention will be described in greater detail on the basis of the accompanying drawings.

DETAILED DESCRIPTION OF THE PREFERRED EMBODIMENT

Figure 1:
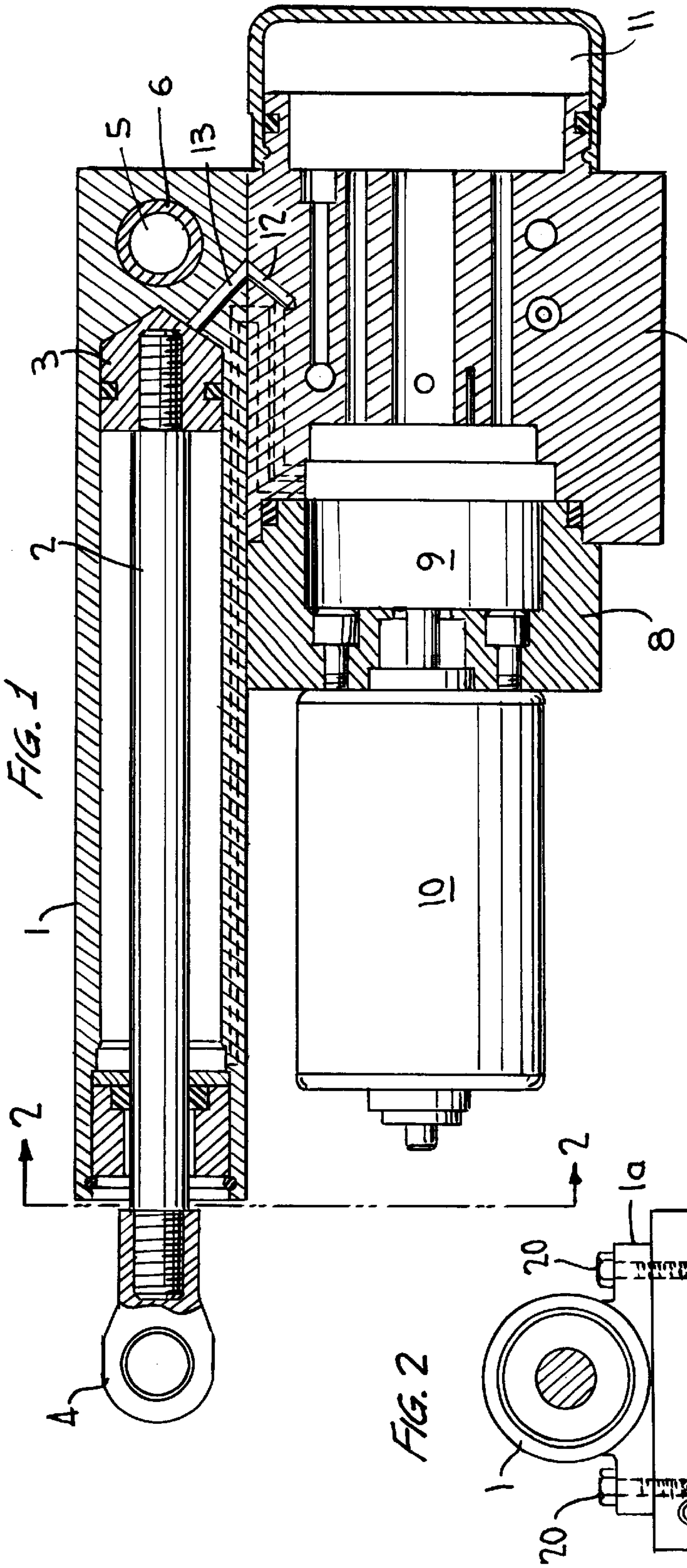
FIG. 1 shows a cross sectional view through an operating arrangement according to a preferred embodiment of the present invention.

FIG. 1 depicts a hydraulic working cylinder 1, preferably made of an extruded section, containing a piston rod 2 on which a piston 3 is mounted or otherwise provided. At the end of piston rod 2 opposite piston 3, a mounting device 4 is provided for attachment to the part of the motor vehicle to be moved, for example the trunk lid or the like, or on a hinge carrying the part to be moved. For this purpose, the rod head 4 is designed as an angle joint, for example. Another mounting device is preferably also provided on cylinder 1, aligned with piston rod 2, preferably in the form of a cross hole 5, with any rubber bearing inserted or with a rubber bushing, serving to mount the operating arrangement on the motor vehicle with a vibration damping effect.

Figure 2:
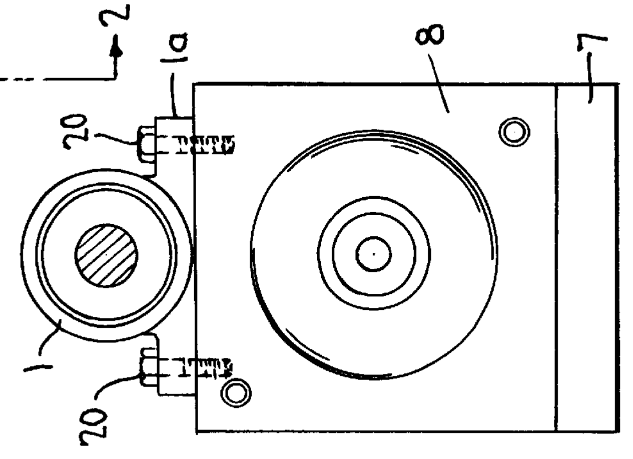
FIG. 2 depicts a view of FIG. 1 as seen along line 2—2.

As shown in FIG. 2, pump arrangement 7 through 11 is mounted as a separate module on working cylinder 1 of the operating arrangement by screws 20 passing through flanges 1*a*, so that ultimately a compact unit that can be handled and moved as a unit is obtained. Due to the easy separability and connectability of the individual parts, the operating arrangement is easily adaptable to any requirement, not only during assembly but also afterwards, through selection and use of optimally suitable parts, and maintenance and repairs are greatly facilitated. Thus, a releasable mounting of pump carrier 7 on the piston end of the working cylinder is provided in an advantageous manner, and the necessary valve arrangements, e.g., reversing and control valves, safety valves and pressure relief valves, etc. (not shown here for the sake of simplicity) can also be built into the pump carrier 7. On one side of pump carrier 7 are the pump flange 8 and pump 9, which may in principle be of any desired design, in particular a radial piston pump. The electric motor 10 for driving the pump is located directly on pump flange 8 and/or on pump 9. Pump 9 and the electric motor 10 may turn in either direction to advantage, in order to be able to operate the double-acting working cylinder 1.

The tank 11 for hydraulic fluid is mounted on the side of the pump carrier 7 opposite pump 9, preferably removably and replaceably, and is connected to pump 9 via suction lines, pressure lines and valves (not shown) in the pump carrier 7. Pump carrier 7 also contains at least one duct 12 through which hydraulic fluid is supplied by pump 9 through at least one additional duct 13 in an end piece of working cylinder 1 to its working chambers, which is preferably the piston end, where the pump arrangement is mainly mounted. Preferably, at least one additional duct is also provided in pump carrier 7 conducting the working fluid through at least a second duct (preferably running in the wall of working cylinder 1 toward the opposite end piece) to the second working chamber. The extruded section from which working cylinder 1 is manufactured offers enough space in its corner areas for connecting ducts, which could be mounted in principle on the outside of working cylinder 1 in any desired manner. Ducts 12 in pump carrier 7 and ducts 13 in working cylinder 1 are connected to one another during the assembly and joining of working cylinder 1 and pump arrangement 7 through 11 by a tubeless flange connection which provides optimal sealing.

The invention has been described with reference to a preferred embodiment. Obviously, various modifications, alterations, and other embodiments will occur to others upon reading and understanding this specification. It is our intention to include all such modification, alterations, and alternate embodiments insofar as they come within the scope of the appended claims, or the equivalent thereof.

I claim:

1. An operating arrangement for a movable part of a motor vehicle which comprises:

a hydraulic cylinder assembly which includes (1) a hydraulic cylinder defining first and second ends, said second end being open, (2) a seal means said second end of said hydraulic cylinder, and (3) a piston which includes a head that is movable in said hydraulic cylinder between said first and second ends and a rod which extends from said head through said seal to a free end beyond said hydraulic cylinder, said first end of said hydraulic cylinder defining a first passageway that extends from a chamber formed between said piston head and said first end of said hydraulic cylinder to an exterior surface of said hydraulic cylinder, a pump arrangement which includes a pump, and motor for driving the pump, and a tank for hydraulic fluid, said pump including a second fluid passageway that extends to an exterior surface thereof, and detachable connection elements for attaching said pump arrangement to said hydraulic cylinder such that said first and second fluid passageways sealingly communicate with each other.

2. An operating arrangement according to claim 1, comprising at least one connecting duct provided in the wall of the hydraulic cylinder leading from one end piece of the hydraulic cylinder to the other end piece and into the other working chamber.

3. An operating arrangement according to claim 1, wherein the pump arrangement consists of a pump carrier with an inserted pump, a tank mounted on the side of the pump carrier opposite the pump, and a motor mounted directly on the pump or a pump flange.

4. An operating arrangement according to claim 1, including first and second mounting devices, said first mounting device being at one end of the piston rod of the hydraulic cylinder and the second mounting device being aligned with the piston rod at the other end of the hydraulic cylinder and/or the pump arrangement.

5. An operating arrangement according to claim 4, wherein at least one of the mounting devices includes a cross hole with a damping brush therein.

6. An operating arrangement according to claim 1, wherein the hydraulic cylinder is made of an extruded section.

7. An operating arrangement according to claim 1, wherein said detachable connection elements include a plurality of screws which extend between the hydraulic cylinder and the pump arrangement.

* * * * *